United States Patent
Dubuque

(10) Patent No.: US 10,699,114 B2
(45) Date of Patent: Jun. 30, 2020

(54) REDUCING THE SEARCH SPACE FOR RECOGNITION OF OBJECTS IN AN IMAGE BASED ON WIRELESS SIGNALS

(71) Applicant: RetailMeNot, Inc., Austin, TX (US)

(72) Inventor: Shaun F. Dubuque, Austin, TX (US)

(73) Assignee: RetailMeNot, Inc., Austin, TX (US)

( * ) Notice: Subject to any disclaimer, the term of this patent is extended or adjusted under 35 U.S.C. 154(b) by 0 days.

(21) Appl. No.: 15/806,868

(22) Filed: Nov. 8, 2017

(65) Prior Publication Data

US 2018/0068184 A1 Mar. 8, 2018

Related U.S. Application Data

(63) Continuation of application No. 15/597,281, filed on May 17, 2017, now Pat. No. 9,842,253, which is a
(Continued)

(51) Int. Cl.
 *G06K 9/62* (2006.01)
 *G06K 9/00* (2006.01)
 (Continued)

(52) U.S. Cl.
 CPC ..... *G06K 9/00536* (2013.01); *G06K 9/00671* (2013.01); *G06K 9/00979* (2013.01);
 (Continued)

(58) Field of Classification Search
 CPC ....... G06Q 30/0267; G06Q 30/0207–30/0239; G06F 17/30247–17/30262;
 (Continued)

(56) References Cited

U.S. PATENT DOCUMENTS 8,559,672 B2 * 10/2013 Greig ................... G06K 9/6257
 382/103
8,660,951 B2 * 2/2014 Calman .............. G06Q 20/3276
 705/14.4
(Continued)

FOREIGN PATENT DOCUMENTS

EP 2487875 A2 8/2012
EP 20120155425 A2 8/2012

OTHER PUBLICATIONS

A Memory Efficient Discriminative Approach for Location Aided Recognition', Computer Vision ECCV 2012. Workshops and Demonstrations, Springer Berlin Heidelberg, Berlin, Heidelberg, Oct. 7, 2012, pp. 187 to 197.
(Continued)

*Primary Examiner* — Brian Werner
(74) *Attorney, Agent, or Firm* — Pillsbury Winthrop Shaw Pittman, LLP

(57) ABSTRACT

Provided is a process including: determining that a mobile computing device has crossed a geofence associated with a merchant store; sending, to a remote classifier server, a request for object-recognition classifiers for objects in the merchant store; receiving a set of object-recognition classifiers; receiving with the mobile computing device from user a request to search for offers; capturing an image with a camera of the mobile computing device; receiving one or more wireless beacon identifiers with the mobile computing device; based on the wireless beacon identifiers, selecting a subset of the object-recognition classifiers in the set of object-recognition classifiers; and recognizing an object in the captured image based on the selected subset of the object-recognition classifiers; and requesting, from a remote offer publisher server, offers corresponding to the recognized object; and receiving offers from the remote offer
(Continued)

publisher server; and displaying the received offers to the user.

20 Claims, 5 Drawing Sheets

Related U.S. Application Data continuation of application No. 14/839,058, filed on Aug. 28, 2015, now Pat. No. 9,684,826.

(60) Provisional application No. 62/072,044, filed on Oct. 29, 2014, provisional application No. 62/043,069, filed on Aug. 28, 2014.

(51) Int. Cl.
  *G06K 9/46* (2006.01)
  *G06K 9/32* (2006.01)
  *H04W 4/029* (2018.01)
  *G06Q 30/06* (2012.01)
  *G06Q 30/02* (2012.01)

(52) U.S. Cl.
  CPC ....... *G06K 9/00986* (2013.01); *G06K 9/3258* (2013.01); *G06K 9/46* (2013.01); *G06K 9/4614* (2013.01); *G06K 9/6227* (2013.01); *G06K 9/6267* (2013.01); *G06K 9/6288* (2013.01); *G06Q 30/0207* (2013.01); *G06Q 30/06* (2013.01); *H04W 4/029* (2018.02)

(58) Field of Classification Search
  CPC .............................. H04W 4/021–4/022; G06K 9/00536–9/00563; G06K 9/00671
  See application file for complete search history.

(56) References Cited

U.S. PATENT DOCUMENTS

| 9,576,214 | B1* | 2/2017 | Zhang | G06K 9/4614 |
|---|---|---|---|---|
| 2010/0211441 | A1 | 8/2010 | Sprigg et al. | |
| 2012/0233070 | A1 | 9/2012 | Calman et al. | |
| 2012/0321175 | A1* | 12/2012 | Hedau | G06K 9/6227 |
| | | | | 382/159 |
| 2013/0226704 | A1 | 8/2013 | Fernandez | |
| 2013/0301882 | A1* | 11/2013 | Kawaguchi | G06K 9/00335 |
| | | | | 382/103 |
| 2014/0085180 | A1 | 3/2014 | Bender et al. | |
| 2014/0136312 | A1* | 5/2014 | Saksena | G06Q 30/0261 |
| | | | | 705/14.39 |
| 2014/0149191 | A1 | 5/2014 | Aguayo | |
| 2014/0180817 | A1 | 6/2014 | Zilkha | |
| 2015/0206069 | A1* | 7/2015 | Beers | G06K 9/6262 |
| | | | | 706/13 |
| 2016/0078484 | A1* | 3/2016 | Emigh | G06Q 30/0211 |
| | | | | 705/14.58 |
| 2017/0039444 | A1* | 2/2017 | Li | G06K 9/4604 |

OTHER PUBLICATIONS

Extended European Search Report for Related EP Application 15836259.0, dated Dec. 12, 2017, pp. 1 to 10.
Examination Report for Related European Patent Application No. 15836259.0 dated Feb. 19, 2019, pp. 1 to 10.
Australian office action related AU application No. 2015308717 issued Apr. 6, 2020 (3 pages).

* cited by examiner

REDUCING THE SEARCH SPACE FOR RECOGNITION OF OBJECTS IN AN IMAGE BASED ON WIRELESS SIGNALS

CROSS-REFERENCE TO RELATED APPLICATIONS

The present application is a continuation of U.S. patent application Ser. No. 15/597,281, titled REDUCING THE SEARCH SPACE FOR RECOGNITION OF OBJECTS IN AN IMAGE BASED ON WIRELESS SIGNALS, filed 17 May 2017, which is a continuation of U.S. patent application Ser. No. 14/839,058, titled REDUCING THE SEARCH SPACE FOR RECOGNITION OF OBJECTS IN AN IMAGE BASED ON WIRELESS SIGNALS, filed 28 Aug. 2015, which claims the benefit of U.S. Provisional Patent Application 62/043,069, titled Reducing The Search Space For Image Recognition Based On Wireless Signals, filed 28 Aug. 2014, and claims the benefit of U.S. Provisional Patent Application 62/072,044, titled Reducing the Search Space for Recognition of Objects in an Image Based On Wireless Signals, filed 29 Oct. 2014. The parent applications are all hereby incorporated by reference.

BACKGROUND

1. Field

The present invention relates generally to computer vision and, more specifically, to reducing the search space in object recognition or detection based on the current wireless environment.

2. Description of the Related Art

Merchants often seek to entice consumers with offers, such as coupons, sales, rebates, favorable shipping terms, or other changes in terms favorable to consumers. Increasingly, such offers are available to consumers electronically, for instance, via the Internet. At the same time, many consumers now carry mobile computing devices, such as mobile phones and tablet computers while in stores of merchants at which the offers are redeemable. Yet many consumers fail to discover offers relevant to their current context, causing consumers to miss-out on valuable savings, merchants to miss-out on revenue, and publishers of offers to miss-out on revenue from offer redemptions.

These lost opportunities are believed to be caused, in part, by the difficulty of searching for offers on mobile computing devices. Text entry of queries is often inadequate. Mobile devices often include relatively small on-screen keyboards that make text entry of offer-search queries difficult. Existing image-based searches also suffer from limitations of some mobile devices. Some devices interface with remote systems to support voice or image-based queries, sending an image or audio to a remote system for a complete analysis, but these systems are often slow, unreliable (due to poor wireless connections), and consume valuable bandwidth, as data-intensive images and audio expressing queries are conveyed from the mobile device to remote image or voice recognition servers for classification prior to searching.

SUMMARY

The following is a non-exhaustive listing of some aspects of the present techniques. These and other aspects are described in the following disclosure. It should be emphasized that, in the interest of being brief, only a subset of the inventions described herein are referenced in this summary.

Some aspects include a process, including: determining that a mobile computing device has crossed a geofence associated with a merchant store; sending, to a remote classifier server, a request for object-recognition classifiers for objects in the merchant store; receiving, from the remote classifier server, a set of object-recognition classifiers; receiving with the mobile computing device from user a request to search for offers; capturing an image with a camera of the mobile computing device; receiving one or more wireless beacon identifiers with the mobile computing device; based on the wireless beacon identifiers, selecting a subset of the object-recognition classifiers in the set of object-recognition classifiers; and recognizing an object in the captured image based on the selected subset of the object-recognition classifiers; and requesting, from a remote offer publisher server, offers corresponding to the recognized object; and receiving offers from the remote offer publisher server; and displaying the received offers to the user.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
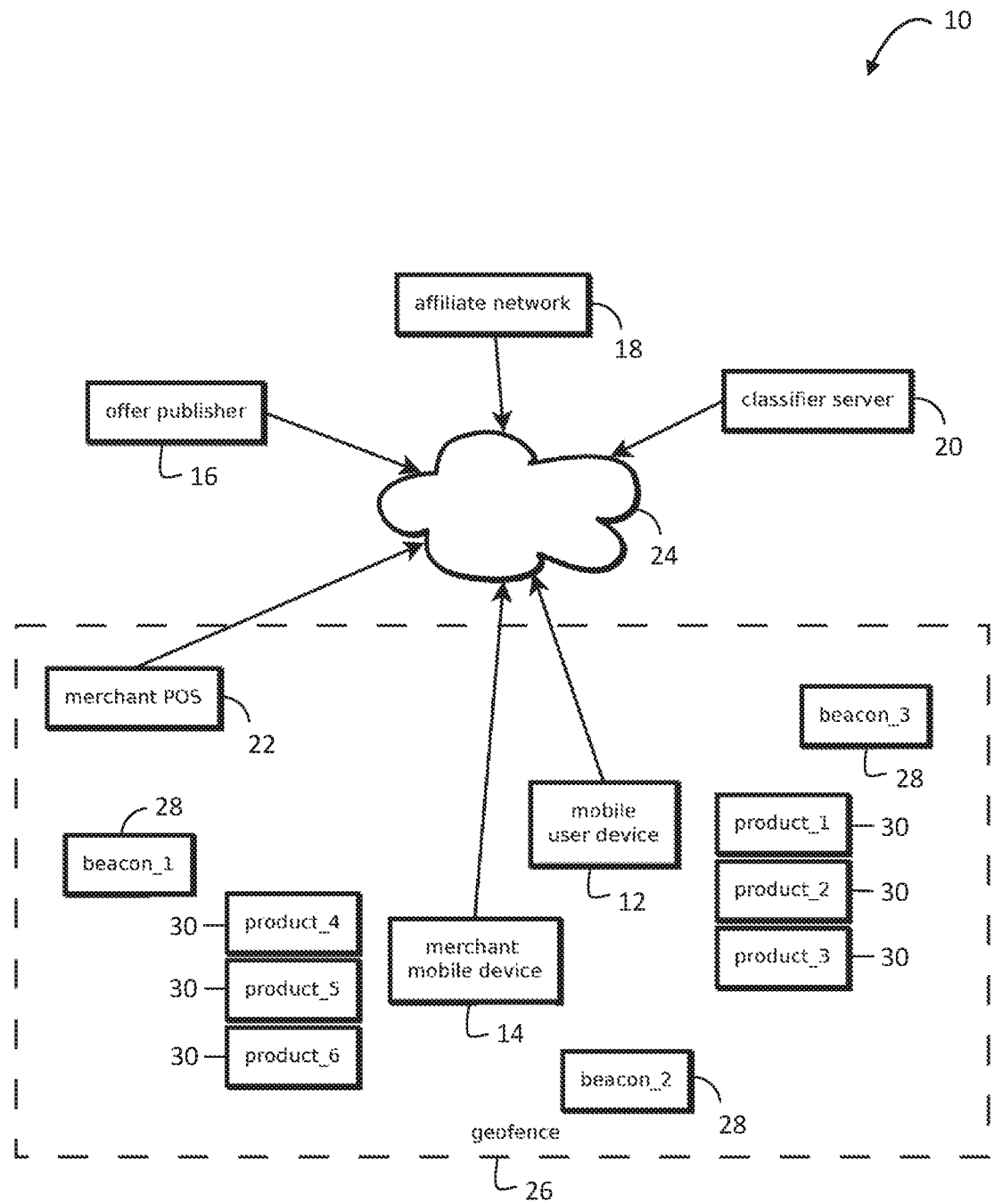
FIG. 1 shows an example of a computing environment in which mobile user devices are used to search for offers based on images of products captured in a merchant store.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the applicants had to both invent solutions and, in some cases just as importantly, recognize problems overlooked (or not yet foreseen) by others in the fields of offer distribution and machine learning. Indeed, applicants wish to emphasize the difficulty of recognizing those problems that are nascent and will become much more apparent in the future should trends in industry continue as applicants expect. Further, because multiple problems are addressed, it should be understood that some embodiments are problem-specific, and not all embodiments address every problem with traditional systems described herein or provide every benefit described herein. That said, improvements that solve various permutations of these problems are described below.

As noted above, consumers often fail to discover relevant offers when in stores, despite generally having with them Internet-connected mobile devices. This is believed to be because many mobile computing devices are not well suited for entry of offer search queries: text entry on small touch-screens is difficult, and image and voice-based search is slow, unreliable, and consumes valuable bandwidth as images or audio are uploaded for classification on remote systems.

This problem is not fully addressed by existing image-based or audio-based search. Queries expressed as images or audio are often remotely classified because traditional computer vision and voice recognition techniques are not well suited for performing image or voice recognition on mobile computing devices. Computer vision algorithms, and object recognition algorithms in particular, are generally computationally complex relative to the capabilities of mobile devices. This complexity arises, in part, from challenges like variations in the orientation of the object being detected in a scene, variations in lighting conditions in a scene, variations in the size of objects in a scene, and intra-class variations in objects being recognized. Making an object recognition algorithm robust to these challenges often substantially increases the complexity of that algorithm, both in terms of processing-time complexity and memory complexity. Further, these complications generally scale with the number of objects to be recognized, making it difficult to classify images or audio in a relatively large search space with a diverse set of categories, as often occurs in retail spaces. In some cases, these issues and other related challenges are referred to in the field as "the curse of dimensionality," which often constrains the types of analysis that can be performed in reasonable time periods with the type of computing resources typically available. This is generally an open problem in the field of computer science and makes the types of activities readily performed by humans, such as recognizing objects in their field of view, difficult for computer systems to perform, particularly when computing resources are constrained, like on a mobile user device. As a result, object recognition algorithms are often not well suited for tasks where computational power is limited and a relatively large number of different objects are to be recognized in a scene, as each additional object for which recognition is to be performed often adds a proportionate increase in the computational complexity of the task. Similar problems are experienced with classification of audio due to complications like variations in background noise, speaker accents, and speaker pitch.

Exacerbating the problems with mobile device user interfaces, many searches include multiple iterations and refinements to search queries, as consumers enter a query, view results, and adjust their query in response. This phenomenon arises frequently when users are searching against a relatively large number of offers, as is commonly the case in modern offer discovery systems. Examples of offer discovery systems that may be searched with the present techniques include those described in U.S. Provisional Patent Application 61/969,119 filed 22 Mar. 2014, and PCT Patent Application PCT/US13/45186, filed 11 Jun. 2013, the entire contents of both of which are hereby incorporated by reference for all purposes. Searches, and iterative searches in particular, are often latency-sensitive activities. Consumers generally have a strong preference for fast responses to queries, preferring, for instance, responses faster than around five seconds.

The inventors have recognized that, while object recognition in images is computationally challenging relative to the capabilities of mobile devices, image recognition becomes computationally tractable when the range of possible objects that a device is attempting to recognize is reduced (e.g., with a reduced set of candidate objects to classify in an image, such as a pre-registered sticker or other marketing material). To this end (and others described below), some embodiments use beacons present in retail stores (e.g., Low-Energy Bluetooth™ beacons arrayed throughout a retail store) to detect a user's location in a store (e.g., a particular department, aisle, or section of an aisle), and use that location to constrain a search space (e.g., a set of candidate objects to be recognized) of images in image recognition tasks (e.g., by excluding from the search space objects in the store that are physically distant from the user). Doing so opens up opportunities to perform real-time (e.g., within less than five seconds) image recognition on consumers' mobile devices, which allows for, among other things, improved retail experiences, e.g., low-latency, on-device, image-based search for offers. Instead of taking a picture and waiting for the cloud to return a match, in some embodiments, a user can simply open their phone and scan it over an aisle/shelf/product display/poster and get related content delivered to their device.

Embodiments, however, are not limited to these types of image search. For instance, the present techniques may be used to constrain the search space for voice-recognition searches, providing similar benefits. Further, not all embodiments solve these problems, as the techniques have other applications, e.g., some embodiments may use the user's location to constrain the search space of recognition or detection tasks performed remotely, expediting cloud-based image or audio detection or recognition tasks.

In one example use-case, a consumer may be trying to decide between two different toothpaste manufacturers while in an aisle of a grocery store. Generally, beacons in the store may indicate (to a native mobile application on a consumer's mobile computing device—a term used interchangeably with "mobile user device" or "merchant mobile device" depending on the user's role) roughly where the user is within the store, e.g., which aisle and, in some cases, within plus-or-minus five-to-ten meters, but are not specific enough to indicate that the consumer is standing in front of the toothpaste section rather than an adjacent section (e.g., a group of competing related products physically located near one another in a store). To locate the consumer, a merchant could deploy a much more dense network of beacons (e.g., positioning a beacon every foot instead of every 25 feet and lowering broadcast power accordingly), but such deployments can be cost prohibitive. Rather, by combing information from images and beacons, embodiments may provide granular targeting opportunities using cost-effective beacon deployments.

In some cases, the present image (or voice) recognition techniques may be implemented with a native mobile application executing on a consumer's mobile computing device, e.g., a hand-held, Internet-connected, battery-powered device, such as smartphone or tablet computer executing the Android™, iOS™, or Windows Mobile™ operating systems. In some cases, a wireless interface of such devices may receive beacon identifiers via an antenna of the device from low-energy Bluetooth™ beacons having a range of less than 100 meters, e.g., less than around 20 meters in typically use-cases. The low-energy beacons may be configured with such broadcast ranges in order to reduce the cost of broadcast hardware and conserve battery life. FIG. 1 shows an example of a retail-store layout with such beacons disposed at the ends of aisles. Each beacon may broadcast a unique identifier, e.g., periodically, such that mobile devices in range may receive the identifier and determine the approximate location of the mobile device, e.g., even in the absence of cellular or satellite navigation (e.g., global positioning system (GPS)) signals, as is often the case in retail stores.

Prior to an image-based search, in some embodiments, the native application executing on the mobile device of a consumer may detect that the consumer is within (e.g., has traversed) a geofence associated with a merchant's physical site (e.g., a brick-and-mortar store), e.g., based on GPS signals, cellular triangulation, or wireless beacons. Examples of techniques by which the user may be determined to be at a particular merchant store are described in U.S. Patent Application 61/969,119, which is incorporated by reference above for all purposes, which includes the geofencing techniques described therein. Additional examples of techniques by which a user may be determined to be at a particular merchant store (or collection of adjacent stores, such as at a mall) are described in PCT Patent Application PCT/US13/45186, filed 11 Jun. 2013, which is also incorporated by reference for all purposes. Determining the user's location may include both a binary determination of whether the user is within a geographic area associated with a store (e.g., within a bounding polygon encompassing the store and, in some cases, the surrounding area, like a parking lot) and a weighting for ranking candidate stores based on proximity to the store. In some cases, this determination of the user's location may be substantially coarser than subsequent determinations of location based on beacons, e.g., ascertaining that the user is at a store, versus ascertaining that the user is on a particular section of a particular aisle in the store.

In response to determining that the user is within a geofence (e.g., at a particular merchant's physical store, or within a geofence of a mall including the store), the native application executing on the mobile device (e.g., as a background process) may request, from a remote classifier server, classifiers for objects known (e.g., indicated by records in memory accessible to the server) to be relevant to the store, e.g., a subset of a larger set of object classifiers stored in the classifier server, the larger set including classifiers for objects in a plurality of different merchants' physical stores. (This subset may itself be a superset of subsets that further reduce the candidate classifiers based on further refined locations, as described below.) In response, the classifier server may send to the mobile device application the responsive classifiers, e.g., a subset of classifiers, associated with the merchant's store, in memory of the classifier server. In some cases, identifying a subset may include ranking classifiers based on distance from the user mobile device and sending those classifiers above a threshold rank.

Pre-caching potentially relevant classifiers on the mobile device upon a user arriving at a store (or becoming proximate to the store or a collection of stores) is expected to expedite later searches within the store and render the search more robust to interruptions in wireless connections, though not all embodiments provide this benefit, e.g., some embodiments may retrieve classifiers at query time. Further, in some cases, downloading geolocation-relevant classifiers is expected to conserve scarce memory and bandwidth on mobile devices. Some embodiments may provide object recognition based offer search for a relatively large number of merchants, e.g., numbering in the hundreds or more and spanning a country or the world, for a large number of products at those merchants, e.g., numbering in the thousands or more. Further, the set of classifiers is expected to change relatively frequently as new products are released. Storing on mobile devices classifiers for all products for all merchants for all merchant stores is expected to consume more memory and bandwidth than users would appreciate. That said, not all embodiments use this technique to conserve memory and bandwidth, as some systems may target smaller sets of products or merchants, making on-mobile-device storage of all relevant classifiers feasible.

In some embodiments, in addition to downloading classifiers corresponding to a geofence, some embodiments may also download offers or other content corresponding to the geofence in response to the native mobile application determining that the user is within the geofence. For example, some embodiments may cache offers on the mobile user device for presentation in the event that the user requests one of the offers held in cache memory (which is not limited to central processing unit (CPU) cache memory, like L2 cache, and includes dynamic random access memory or persistent memory, such as flash storage). In these embodiments, after a product is classified in an image, the native application may search cache memory for offers responsive to the identified product such as, for example, offers containing keywords in the offer description that match that of the name of the identified product or are in the same category as the identified product. One advantage of this technique is that some embodiments may provide image-based queries for offers and responsive offers to users on mobile user devices even when those mobile user devices are without wireless connection, as often happens while inside a store. That said, not all embodiments provide this benefit, as various engineering and cost trade-offs may be made, for example, a decision to reduce bandwidth usage associated with downloading offers that may never be displayed to the user in favor of offer retrieval at query time.

Later, while in the merchant's store (e.g., on a given aisle) or just outside the merchant's store (e.g., in front of a store display window), the user may instruct the native application to capture an image of an object (e.g., a product taken from or sitting on a store shelf of the merchant) with a camera of the user's mobile device. In response, the native application may capture the image, determine which wireless beacons are presently in range (e.g., beacons for which identifiers were last received or were/are received within some duration of time, e.g., within a 500 millisecond duration). In some cases, the native application may triangulate the position of the user based on multiple beacon identifiers (the location of which may also be downloaded from the classifier server upon the user crossing the geofence of the store) and signal strengths of signals received by the mobile device and conveying the beacon identifiers. Some embodiments may submit the beacon identifiers to a remote server to translate the identifier to an in-store location, as some beacon providers may obfuscate their beacon identifiers with periodic changes to the identifier to sell services by which the obfuscated identifiers are converted into locations.

Using these signals from beacons, the native application may calculate, or otherwise determine, the user's approximate location in the store, e.g., determine a store department or an aisle in which the user is positioned, and in some cases a section of a department or an an aisle, e.g., the half of the aisle closer to one of the beacons, or a product category section, like the toothpaste section of the aisle. Other embodiments may use other wireless signals, including identifiers encoded in overhead light fluctuations and sensed with a light sensor of the mobile device, identifiers encoded in audio signals like in-store music or ultrasonic beacons, or identifiers encoded in other types of radio signals, like service set identifiers (SSID) values in WiFi Beacons™. In some cases, the user's position may be determined within plus or minus five meters or less to narrow the universe of candidate objects to be detected to the diversity of products a merchant physically positions within a five-meter radius of the user. In some cases, a confidence value is associated with the user's position, e.g., a 50% confidence radius around a location, and a larger radius corresponding to a 90% confidence score. In some cases, the confidence radius is used by the native application to weight the output of classifiers, e.g., down-weighting the output of classifiers corresponding to products in locations in which the confidence score is lower based on distance from the estimated user location.

In some cases, the beacon-inferred location may be refined based on other signals. For instance, some embodiments may poll a magnetometer of the user's mobile device to ascertain a direction in which the mobile device is pointing, thereby inferring both an aisle and a side of an aisle in some cases. This refined location may be used to further reduce the search space for object recognition, further reducing the size of the subset of classifiers to be applied to a captured image, e.g., by selecting those classifiers corresponding to products on a store shelf in a direction in which the user is facing, as indicated by the magnetometer.

Upon determining the user's approximate location (and, in some cases, orientation) within a store, some embodiments may select a subset of the classifiers previously retrieved from the remote classifier server. In some cases, the classifier server may send the classifiers with an associated store area to which the classifier pertains, e.g., a classifier may be associated with (e.g., contain, refer to, or be referred to by, either directly or indirectly) data that indicates the classifier pertains to (e.g., can be used to classify) objects expected to be in a particular section of a given aisle (like the toothpaste section of an aisle). The mobile application may select the subset of the previously downloaded classifiers relevant to the determined location. In other embodiments, the native mobile application may request classifiers pertinent to the determined location at the time the location is determined from the classifier server, though this approach is expected to exhibit greater latency. In some cases, identifying, e.g., selecting, a subset may include ranking classifiers based on distance from the user mobile device and applying classifiers above a threshold rank or applying classifiers in order of rank until a match is found.

In some cases, the subset of classifiers may be substantially smaller than the set of classifiers pertaining to the entire store, e.g., less than one fifth, less than one tenth, or less than one hundredth the size of the larger set. Reducing the number of classifiers at issue is expected to facilitate faster object recognition and make relatively-accurate object recognition feasible even on a mobile user device, such as a cell phone or other hand-held computing device having a portable power supply and wireless Internet access. Often, machine visions programs apply every classifier potentially at issue to a given image, making the process relatively slow when a large number of classifiers potentially apply. Further, because the images are analyzed on the mobile user device, larger sample sizes of images, such as multiple images captured as video frames may be analyzed, a use case that is expected to be much slower if the large amount of data encoding the video is uploaded over a relatively slow cellular connection to a remote system for analysis. That said, the present techniques are also applicable to use cases in which remote object detection is performed, as those systems are also expected to benefit from reducing the number of classifiers at issue.

In response to selecting classifiers, embodiments of the native mobile application may apply those classifiers to the captured image with processes executed by the mobile device. The classifiers are operative to cause the mobile device to recognize objects in images, like a merchant's products, without those objects being optical machine readable representations of data, like a barcode or QR code (though such objects may have thereon barcodes and the like, e.g., either inside or out of the field view). In some cases, the applied classifiers may be classifiers for objects on the shelf of the merchant near where the beacons indicate the consumer is standing. The applied classifiers may, in some cases, be cascaded, such that the application of one classifier for a product depends on another classifier for the same product indicating that the product is potentially in the captured image.

Examples of classifiers include a parameter set (specifying inputs to the classifier other than the image to be classified, like weights, thresholds, or coefficients) combined with a Haar classifier; a histogram classifier; color-based classifier such as those using spatial histogram features (like those described in Object detection using spatial histogram features, by Zhang et al. in the Journal Image and Vision Computing, Volume 24 Issue 4, Pages 327-341, April, 2006, which is incorporated by reference), color adjacency graphs (like those described in The Color Adjacency Graph Representation of Multi-Coloured Objects, by Matas et al., in the proceedings of the International Conference on Computer Vision, 1995), or multimodal neighborhood signatures MNS (like those described in The multimodal neighborhood signature for modeling object color appearance and aplications in object recognition and image retrieval, by Matas et al., in the Journal of Computer Vision and Image Understanding, 2002), or the like. Other examples include neural network classifiers, or support vector machine classifiers, such as those that use Histogram of Gradients HoG feature descriptors. In some cases, each classifier may cause a routine executing on the mobile device to receive as input a captured image, along with parameters encoded in the classifier, and output one or more scores, which may be compared to a threshold by the native application executing on the mobile device to determine whether an object characterized by the classifier is depicted in the input image (or in the case of cascaded classifiers, whether to apply one or more downstream classifiers in the cascade to further analyze whether a particular object is depicted). In other embodiments, the user may speak audio queries for offers relevant to their location, and classifiers for audio may be selected. Examples of classifiers are described in a paper titled "Rapid Object Detection using a Boosted Cascade of Simple Features" by Viola et al., from the Computer Vision and Pattern Recognition conference of 2001, which is hereby incorporated by reference in its entirety for all purposes.

In some cases, each classifier may be encoded as a serialized data format, like JavaScript™ object notation (JSON) or extensible markup language (XML), that is downloaded from a remote classifier server. A mobile user device, upon determining that the device is within a geofence of a merchant, may query the remote classifier server for classifiers of products of that merchant, and the classifier server may respond with a serialized representation of the classifiers. In some cases, each classifier may include an identifier (e.g., a name expressed as a text string or a universal product code (UPC)) of a given product that the classifier is configured to recognize, one or more algorithms that when applied to the image yield a score indicative of whether the product appears in the image, parameters of those algorithms, sequences of such algorithms and weightings for combining scores of the algorithms (e.g., with boosting, like with the Adaboost algorithm), and an indication of the location within the store where the product is expected to be found (e.g., a beacon identifier in range, an aisle number combined with linear offset from an endcap expressed in meters, or a product section name) that may be used to select the classifier based on a beacon received by the mobile user device.

An example of a serialized representation of a Haar-based classifier, as sent in response to a request for classifiers, is reproduced below:

```
{
  "beacons": [
    {
      "name": "RMN_MOBILE",
      "type": "gimbal",
      "identifier": "15SN-7EJW9",
      "rssi_threshold": -70
    }
  ],
  "classifiers": [{
    "type": "opencv-haar-classifier",
    "target": { },
    "info" : {
      "size": "36 18",
      "stages": [
        {
          "trees": [
            {
              "feature": {
                "rects": [
                  "0 0 2 4 -1.",
                  " 0 2 2 2 2."
                ],
                "tilted": "0"
              },
              "threshold": "-4.8783610691316426e-004",
              "left_val": "0.5921934843063355",
              "right_val": "-0.4416360855102539"
            },
            {
              "feature": {
                "rects": [
                  "34 10 2 8 -1.",
                  "34 14 2 4 2."
                ],
                "tilted": "0"
              },
              "threshold": "-4.2209611274302006e-004",
              "left_val": "0.3031865060329437",
              "right_val": "-0.3291291892528534"
            },
            {
              "feature": {
                "rects": [
                  "15 0 18 10 -1",
                  "24 0 9 5 2.",
                  "15 5 9 5 2."
                ],
                "tilted": "0"
              },
```

-continued

```
              "threshold": "0.0372891984879971",
              "left_val": "-0.2866730093955994",
              "right_val": "0.5997999906539917"
            }
          ],
          "stage_threshold": "-1.2678639888763428",
          "parent": "-1",
          "next": "-1"
        },
        {
          "trees": [
            {
              "feature": {
                "rects": [
                  "4 7 28 3 -1.",
                  "11 7 14 3 2."
                ],
                "tilted": "0"
              },
              "threshold": "0.0381411388516426",
              "left_val": "-0.3327588140964508",
              "right_val": "0.7783334255218506"
            }
          ],
          "stage_threshold": "-1.5844069719314575",
          "parent": "0",
          "next": "-1"
        }
      ]
    }
  }]
}
```

In some cases, algorithms identified by the classifiers may be pre-stored on the mobile user device, e.g., when the native mobile application is installed, and the classifiers may specify parameters of those algorithms. Pre-storing the algorithms and making them accessible as functions of the native application is expected to reduce bandwidth usage and latency, as many classifiers may use the same algorithm with different parameters. For instance, a classifier may identify a histogram classifier (but not itself contain the entire algorithm for implementing the histogram) along with bin sizes and thresholds for determining whether a certain amount of a certain colors are present in a portion of an image, e.g., three colors corresponding to packaging of a product being recognized that are expected to yield peaks in a color histogram of an image containing that product. In some cases, when performing object recognition, embodiments may parse the classifier; determine that a string naming a histogram function is present; and in response, call a corresponding function of the native application, passing parameters of the classifier and the image as arguments. Similar techniques may be used with the other types of object recognition classifiers described herein to expedite object recognition. That said, not all embodiments provide this benefit, as the present techniques are also useful in systems that download the full algorithms each time.

Examples of object recognition techniques implemented with the classifiers include: color-based image retrieval and object recognition which is suitable for structured objects with non-uniform colors; Haar classifiers which take longer to train but are more robust to lighting and scale changes, and neural networks which also take a long time to train but are fast to execute and do not necessarily require complex feature extraction methods.

In some cases, embodiments may expedite processing of the classifiers by paralleling operations on the mobile user device. For instance, some embodiments may execute multiple concurrent threads (e.g., on different cores of the user's mobile device), with each thread executing a different one of the relevant classifiers on the same image. In another example, different portions of an image may be processed in parallel with the same classifier, e.g., the image may be segmented, for instance into 32 pixel by 32 pixel blocks, and each segment may be processed with a single classifier concurrently with the different threads, for instance, binning pixel values in the segments to populate a histogram for a histogram classifier, calculating normalized pixel values for each segment, or down-sampling the segments by calculating average pixel values for each segment. In some cases, the classifiers may be processed with a graphics processing unit of the mobile user device to further expedite processing by distributing computing tasks among even more concurrently executing cores.

In some cases, the native mobile application may capture a plurality of images, e.g., by buffering frames of captured video. In some embodiments, frames of video are captured in buffer memory until the native mobile application determines that less than a threshold amount of movement of the mobile device is indicated by an accelerometer of the mobile device (e.g., as is expected to happen when a consumer pauses over the product in which they are interested), and in response the frames in the buffer may be analyzed with the classifiers. Detecting a movement pause as an event indicating a query is requested is expected to expedite queries for users, as the user need not locate and engage buttons on a screen of the device (though embodiments are also consistent with touch-based inputs to initiate a query). To this end, in some embodiments, the native application may periodically poll an accelerometer of the mobile device and compare a current output of the accelerometer to determine whether less than a threshold amount of movement has occurred in a trailing duration of time, e.g., by comparing an average output over a trailing duration (like over one second) to a threshold.

Alternatively, or additionally as a subsequent or predicate condition, in some cases, a user may initiate image analysis and subsequent queries with a spoken command, e.g., the native application may buffer received audio and perform voice recognition on the audio to detect whether audio sensed by a microphone of the mobile device includes a keyword indicative of a user intent to submit an image-based query, like a spoken command to "find me deals."

Alternatively, or additionally as a subsequent or predicate condition, in some cases, embodiments may sense gestures to initiate image-based offer search. For instance, embodiments may poll the user device accelerometer, buffer measurements from the accelerometer, and periodically interrogate the movement-measurement buffer to determine whether the measurements indicate that the user has moved their mobile device in a pattern corresponding to a particular gesture. For instance, embodiments may determine whether the movement buffer indicates that the use has moved the phone in a circular motion by determining whether movement vectors in the buffer indicate such a movement, e.g., with dynamic time warping techniques, examples of which are described in Mace et al, "Accelerometer-Based Hand Gesture Recognition using Feature Weighted Naïve Bayesian Classifiers and Dynamic Time Warping," UI'13 Companion, Mar. 19-22, 2013, Santa Monica, Calif., USA, ACM 978-1-4503-1966-9/13/03, the contents of which are incorporated by reference in their entirety. In other cases, multiple devices associated with the user may cooperate to initiate a search, e.g., using these techniques, a gesture may be sensed with a wearable device, such as a smart watch detecting that the user has elevated their wrist, rotated their wrist, and accelerated their wrist downward, causing a process executing on the wearable device to send a signal to the mobile user device, a signal that when received causes the mobile user device to search for offers for products in the field of view of the mobile user device's camera.

Embodiments may interact with wearables (e.g., wrist-based smart watches or face-based interfaces, like Google Glass (™) with a number of techniques. For example, in some embodiments, a user may scan (e.g., capture one or more photographs from different poses) a store shelf with their phone, and a first native application executing on the phone may wirelessly send instructions to a second native application executing on a wearable device (the two applications together forming a personal distributed application) that may cause a notification indicative of relevant offers to appear on their wearable. Or, with some wearables, a native application executing on the wearable may perform the client-side steps described herein, and a user may, for instance, point their wrist at a product shelf, a gesture which may be recognized by the wearable and may initiate image capture with a camera on the wearable device, and receive information about relevant offers, e.g., on the wearable or on another device, like their mobile phone or another wearable device.

In some cases, each classifier (or cascade of classifiers) may yield a score for a given object for a given frame of video (or stand-alone image). In some cases, the scores for multiple frames in the buffer (e.g., more than five consecutive frames) may be combined (e.g., by calculating a measure of central tendency, like a mean score, a mode score, or a median score) to reduce the effect of artifacts from image capture, like out-of-focus frames or frames blurred by movement, though some embodiments may operate on a single stand-alone image as well. Embodiments may determine whether the combined scores for each product near the location (as determined based on the wireless radio signals received, like beacon identifiers and signal strengths) satisfy a threshold (e.g., exceed the threshold).

Upon determining that the scores for the classifiers for a product satisfy the threshold, embodiments of the native mobile application may submit a query for offers corresponding to the product to an offers engine (e.g., to a publisher of electronic offers). In some embodiments, each received classifier (or cascade of classifiers) may be associated in the received data with a string descriptive of the object classified, like a name of a product that the classifier is configured to detect in an image, e.g., "Crest™ toothpaste or a category of products, like toothpaste or running shoes. The string may be submitted to a remote offers engine (or used with locally cached offers, such as offers cached upon crossing a geofence) to retrieve or otherwise select responsive offers.

The query formed from the string (which may be the string itself) may, in some cases, request offers for the particular product detected, e.g., in-store coupons for a particular brand of toothpaste; offers for a category of products detected, e.g., offers for products in the category of toothpaste or toiletries upon determining that the consumer is in that section of the store aisle; or offers for products competing with the detected product, e.g., the query may be sent to an online automated auction to have offers shown when a classifier determines that a consumer captured an image of a particular product (the auction being executed in an offers engine). In some cases, the offers engine may select a winning bid in such an auction and send an offer corresponding to the bid to the user's mobile device. The offers engine may identify responsive offers and may send the mobile device instructions to display the responsive offers. In some cases, offers may be cached on the mobile device in advance, e.g., at the time classifiers are downloaded, and embodiments of the native application may select offers responsive to the query from cached offers pre-loaded on the mobile device for reduced latency.

In some cases, some embodiments of the native application may determine that an image depicts more than one product in response to classifiers for the products satisfying a threshold. In response, a variety of actions may be taken, depending on the embodiment. Some embodiments may request offers for each recognized product. Some embodiments may rank the products based on classifier score and request offers for the highest-scoring product. Some embodiments may rank detected products based on position in the image, e.g., calculating an average position (or other measure of central tendency) among multiple images in some cases, and request offers for the product having an average location detected closest to the center of the images. In some cases, queries for multiple products may be requested, and responsive offers may be ranked for presentation based on these techniques.

In some cases, some embodiments of the native application may determine that an image does not depict any products, e.g., in response to determining that no classifiers yielded a score above a threshold. In response, a variety of actions may be taken, depending on the embodiment. Some embodiments may request additional classifiers for adjacent locations in the store and repeat the object-recognition process to accommodate scenarios in which the location determination was in error. Some embodiments may request (or otherwise select, e.g., among cached offers) all offers corresponding to the user's location in the store, showing for instance, all offers related to personal grooming or shoes, rather than toothpaste or running shoes, respectively. In some cases, e.g., where the number of offers corresponding to a user's location is determined to be less than a threshold amount by the native application, some embodiments may omit the object recognition process and select all offers corresponding to the location for display, which is not to suggest that other steps or features may not also be omitted in some embodiments.

Thus, some embodiments may display offers to a user in response to the user pointing a camera of a mobile device at products on a store shelf (or other in-store display, like a store rack, a poster in a store, or the like). In some cases, offers may be identified based on the image without sending the image to a remote server for classification, thereby expediting the display of search results, as the images are often much more data intensive than other types of content, like string expressions of queries and responsive offers.

In some cases, merchant employees may update the classifier server by executing, with a mobile device of the merchant employee, a tagging native mobile application that captures images and associated wireless environment fingerprints. For instance, upon updating inventory on store shelves, the merchant employees may walk through the aisle capturing images (e.g., video or stills) of the products on the shelves with the native mobile application on their device. While (e.g., within a few hundred milliseconds, like within 500 milliseconds to limit the amount of movement) of when images are captured, the current wireless environment may be sampled by the tagging application, e.g., beacon identifiers in range of the employee's mobile device may be captured along with signal strengths, and the wireless beacon may be associated with the image in memory accessible to the native application, e.g., by expressly associating the beacon(s) identifier(s) and signal strength(s) with an image, or indirectly by determining a location (like an aisle and store section) based on the beacon data and associating the location with the image.

In some embodiments, after image capture, using the tagging native application on the employee's mobile device (or another device to which the mobile device is synced, e.g., via a cloud-based software as a service system for hosting the images and receiving tagging information from other computing devices, like a desktop computer of the employee used to tag image hosted by the service), the employee may tag the items appearing in the images, e.g., by drawing a box around an item in a picture with the touchscreen of the mobile device.

In some cases, product tagging in images may be automated by enhancing the scene including the product with distinct, readily machine-recognized objects indicating where the product appears in the scene. For example, prior to imaging a product, a merchant employee may attach stickers in the upper right and bottom left corners of the product to be imaged, thereby defining in the scene a bounding box including the product. The stickers may be removable (e.g., adhering with a removable adhesive putty) and of a shape and color that is readily detected with an object detection classifier, such as a red square sticker for the upper right corner and a red blue sticker for the lower left corner. Prior to teaching a classifier for recognizing the product, some embodiments may use an object detection classifier to detect the position of these two stickers in the frame and, in response, discard (e.g., crop) the portions of the image outside of a bounding box defined by these stickers to cause the classifier for the product to be primarily taught based on the portion of the image with the product, without a merchant employee engaging in more time-intensive manual tagging of products in images. In another example, an adjustable frame may be placed around the product being imaged, such as red-colored frame formed by two, opposing L-shaped members joined by a sliding joint in each leg to allow for adjustments to the size of the aperture of the frame. The red frame appearing in an image of a product may be algorithmically detected, e.g., by filtering from the image the red pixel values and performing edge detection or blob detection on the resulting image and the pixels corresponding to the interior edges of the frame may specify a bounding box of the product being classified in the image. Or, in this example, some embodiments may calculate a moving average of red pixel values as a function of horizontal distance and vertical distance across the image and select the two highest points as defining a bounding box of the product. To render these techniques more robust to products having similar coloring that might confuse an algorithm, some embodiments may use a frame or stickers with a distinct pattern, e.g., an outer green frame bounding an inner red frame, or stickers with black and white arrows pointing toward the product.

Augmenting the scene prior to product image capture is expected to be particularly helpful in instance in which product imaging and tagging is performed by capturing video frames with the merchant employee's mobile device, as video tends to yield a large number of images in which the position of the product may change. For instance, a merchant employee may augment a scene with a product with items designating the boundaries of the portion of a scene in which the product is positioned, and the merchant employee may be instructed to capture video of the product by moving the mobile device in a spiral motion toward the product, thereby capturing a plurality of frames from plurality of different camera poses, each including in the image information by which the location of the product at issue in the image can be automatically detected, without yet having a classifier for the product itself. These video frames may be cropped based on the location of the scene-augmenting objects appearing in the frames, and the cropped frames may be used as a training set for training classifiers to detect the product. In other embodiments, however, products in images may be manually tagged by merchant employees.

In some cases, after an employee identifies a product on a screen of the employee's mobile device, the employee may be instructed by the tagging native application to scan a barcode of the item with the camera of the mobile device or type in the name (or UPC code) of the item. To this end, some embodiments of the mobile application may detect when a user has identified an item on a screen showing a captured image (e.g., with a release-touch event); launch video camera application of the mobile device; and detect and read in frames of video a bar-code. In some cases, items may be tagged on a different device, e.g., on a desktop computer. The tagged images (e.g., images associated with polygons having vertices corresponding to pixels in the image that define boundaries of an item in the image, as indicated by the merchant employee), a product description (e.g., a UPC code or product description), and associated beacon information (which may include a location identified by the beacon) may be sent to the classifier server, which may calculate classifiers for the items (e.g., based on the pixels inside the polygons) and determine locations for the items based on the beacons. In some cases, multiple images of an item may be captured and tagged from differing perspectives to make the classifiers more robust to variations in camera pose from consumer-captured images.

The data captured with the tagging native application may be sent to a classifier server, which may have a classifier training module operative to train new classifiers based on the obtained data. In some cases, classifiers may be calculated by sub-sampling the captured images to various degrees to determine scale-invariant classifiers, and in some cases parameters of classifiers may be determined by performing a stochastic gradient descent using the captured images as a training data set. Some embodiments may input the training set of images into a boosting machine learning algorithm, such as the Adaboost algorithm. Some embodiments may calculate parameters and weights of classifiers based on iterated attempted classifications, error calculation, adjustments to weights and parameters based on gradients in the errors as a function of the weights and parameters (adjusting by an increment in a direction the gradients indicate is likely to reduce the error), and determinations of whether less than a threshold amount of error has occurred, thereby indicating calculating of an adequate classifier. In some cases, this iterated technique may be repeated for multiple arbitrarily (e.g., randomly) chose initial values of heights and parameters, and the results of each repetition may be compared to identify the repletion providing the lowest error, thereby potentially avoiding local minimums in the parameter space. The resulting classifiers may be stored in memory of a classification server in classifier records, each record including the classifier (which may include, along with the parameters—like weights, coefficients, thresholds, and the like for machine vision algorithms—an identifier of a machine vision algorithm, an identifier of the product, and a data indicative of the wireless environment where the training images were captured) and a merchant store identifier that may be correlated with a geofence around the merchant's store.

In other examples, classifiers may be obtained with other techniques. For example, some product makers may provide classifiers for their products to merchants or classifier servers. In other examples, a merchant may replicate a wireless environment across a plurality of stores, and classifiers trained based on data from one store may be re-used in other stores.

FIG. 1 shows an example of a computing environment 10 in which the above-described techniques may be implemented. In this example, the computing environment 10 includes a mobile user device 12 executing an example of one of the above-described native applications for searching for offers based on images of products. The computing environment 10 may also include a merchant mobile device 14 that may have and execute a native application for capturing training data for creating classifiers for products. The computing environment 10 may further include an offer publisher 16, an affiliate network 18, a classifier server 20, a merchant point of sale terminal 22, and the Internet 24 through which these components 12, 14, 16, 18, 20, and 22 may communicate with one another, for example, via various networks connected to the Internet, such as local-area networks, and cellular networks.

The illustrated mobile devices 12 and 14 may be various types of hand-held computing devices having a portable power supply, such as a battery. The mobile devices 12 and 14 may each include a processor having one or more cores, a cellular radio, a Bluetooth radio, wireless antennas, memory, Wi-Fi radios, cameras, magnetometers, accelerometers, and printed circuit boards connecting these components. In some cases, the mobile devices 12 and 14 are smart phones or tablet computers executing an operating system, such as the iOS™ operating system, the Android™ operating system, or the Windows Mobile™ operating system. The mobile devices may execute various drivers through which operating system application program interfaces may control and receive data from the various components of the mobile devices. Executing within the operating systems may be one or more of the native applications described above for capturing training data to train object classifiers for merchants or for searching for offers based on images of products. In some cases, the native applications may be hosted by a provider of the operating system and downloaded by users to the mobile devices 12 or 14. In some cases, the native applications may create records in persistent memory of the mobile devices (e.g. flash storage) that stores configuration data, such as user profiles and identifiers of merchants, by which activities on the mobile devices 12 and 14 may be correlated with corresponding merchant or user accounts by the offer publisher 16, the affiliate network 18, or the classifier server 20. In this example, only two mobile devices 12 and 14 are illustrated, but in commercial implementations, substantially more mobile devices, for example, more than 10,000 or more than 100,000 are expected to be in use in thousands of stores distributed over relatively large geographic areas, such as spanning an entire country, continent, or the world. In some embodiments, mobile user device 12 may execute a process described below with reference to FIG. 2 to search for offers based on images of products, and merchant mobile device 14 may execute a process described below with reference to FIG. 3 to capture training data for training or otherwise calculating new classifiers for new products.

The offer publisher 16, in some embodiments, may include one or more servers operative to receive queries for offers from the mobile user device 12, for instance, queries created by recognizing products appearing in images using the techniques described herein, and in response to such queries, send the mobile user device 12 responsive offers. Examples of offer publisher 16 are described in reference to the offer discovery systems discussed above and incorporated by reference.

The affiliate network 18, in some embodiments, may include one or more servers operative to distribute offers to offer publisher 16, track usage of offers by consumers, report such usage to merchants and brands along with associated billing, and compensate offer publishers 16 for distributing offers to consumers. Examples of affiliate networks 18 are described with reference to the offer discovery systems discussed above and incorporated by reference. In some cases, a single computing system operated by a single entity may fill the roles of both the affiliate network 18, the offer publisher 16, and the classifier server 20.

Classifier server 20, in some embodiments, may include a server for receiving training data and responding to queries for classifiers along with one or more computers for training classifiers (e.g., a classifier training module configured to perform the training steps described herein) and a data repository for storing classifiers in association with records indicating the geofences to which the classifiers pertain (e.g., a key-value store having keys based on (e.g., a hash of, or sorted by) geofence identifiers and values containing the classifiers for expedited retrieval of classifiers). In some embodiments, the classifier server may be operative to perform a process described below with reference to FIG. 4.

In some embodiments, the merchant point-of-sale terminal 22 may include a computing device, such as a cash register having a barcode scanner in a merchant's store (i.e., a physical brick and mortar store). In some embodiments, the point-of-sale terminal 22 may be operative to scan barcodes of products being purchased by users and receive from the user, for instance, from the user's mobile device 12, an identifier of an offer, such that a discount or other terms associated with the offer may be applied. In some cases, the offers include an identifier of the offer publisher 16 or the affiliate network 18 such that when the merchant point-of-sale terminal 22 or other merchant computer system reports a purchase and redemption of the offer to the systems, the appropriate parties may be billed and compensated for the offer redemption. In some cases, the offers are associated with a single-use offer identifier, and the merchant point-of-sale system 22 or other merchant computer system may verify that the single-use offer identifier has not yet been redeemed, thereby potentially impeding efforts by consumers to double-redeem offers.

FIG. 1 also shows a geofence 26 around a merchant's store. The geofence may have a variety of different shapes and specifications, for example, being defined by a polygon having latitude and longitude coordinates as vertices, or being defined by a center point and radius around a merchant's store or collection of merchant stores. Within the illustrated merchant store geofence 26, in this example, are three beacons 28, which may be distributed throughout the merchant's store. In some embodiments, the beacons 28 may be Low-Energy Bluetooth™ beacons (e.g., operating in accordance with corresponding portions of the Bluetooth™ Core Specification version 4.0) configured to broadcast a beacon identifier over a relatively small range, such as less than 50 meters, thereby providing relatively fine-grained indicators of location within a merchant's store. Three beacons are illustrated in this example, but commercial embodiments are expected to include substantially more beacons to provide even finer grained location information. The illustrated example further includes a number of products 30 of which mobile devices 12 and 14 may capture images for searching for related offers or for capturing training data, respectively.

Figure 2:
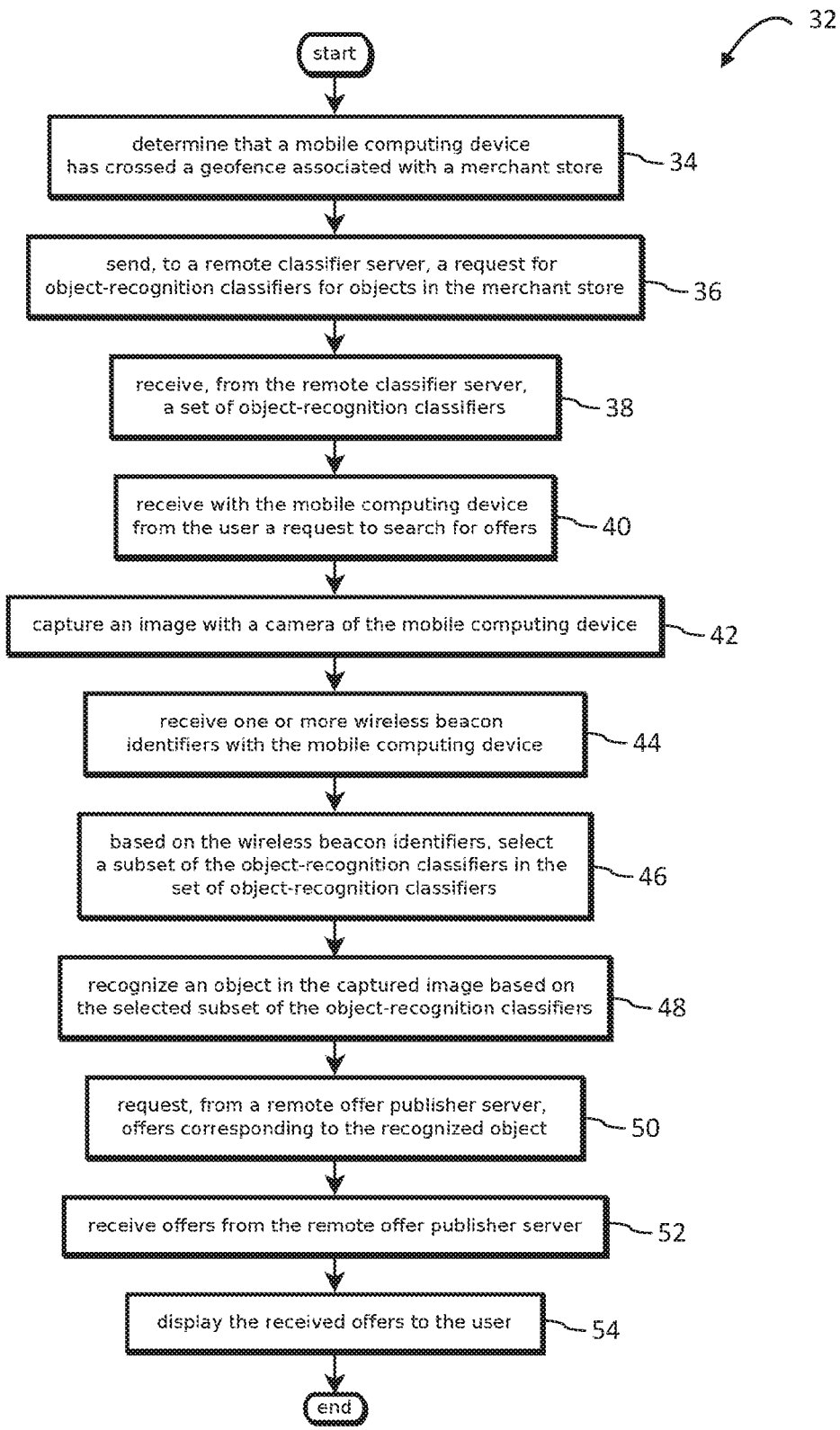
FIG. 2 shows an example of a process for searching for offers based on images.

FIG. 2 shows an example of a process 32 for searching for offers based on images of products captured by a mobile user device while in a merchant's store. In this example, the process includes determining that a mobile computing device has crossed (e.g., is within) a geofence associated with a merchant's store, as indicated by block 34, and sending, to a remote classifier server, a request for object-recognition classifiers for objects in the merchant's store, as indicated by block 36.

In some cases, alternatively or additionally, other signals may serve as events that cause requests for classifiers to be sent for a particular merchant's store. For instance, embodiments may predict a user's propensity to visit a particular store based on the current context, for example, by sending query a weather reporting service with the user's current location and, upon receiving results indicative of the first cold front of a season, downloading classifiers for nearby coat stores, as a user is likely to travel to such a store in the near future. In another example, a wireless beacon on a subway line may indicate that a user is likely traveling to a subsequent stop on the line, and embodiments may, in response to receiving this beacon, download classifiers relevant to locations at or near the subsequent stop. Thus, some embodiments may retrieve context-relevant classifiers even in the absence of GPS signs.

Next, in this example, the process 32 may include receiving, from the remote classifier server, a set of object-recognition classifiers, as indicated by block 38, and receiving with the mobile computing device from the user a request to search for offers, as indicated by block 40. Embodiments may further include capturing an image, responsive to the request, with a camera of the mobile computing device, as indicated by block 42, and receiving one or more wireless beacon identifiers with the mobile computing device, as indicated by block 44. Next, embodiments may include selecting, based on the wireless beacon identifiers, a subset of the object-recognition classifiers in the set of object-recognition classifiers, as indicated by block 46, and recognizing an object in the captured image based on the selected subset of the object-recognition classifiers, as indicated by block 48. Embodiments may include requesting, from a remote offer publisher server, offers corresponding to the recognized object, as indicated by block 50, and receiving offers from the remote offer publisher server, as indicated by block 52. In some cases, the received offers may be displayed to the user, for example, on a display screen of the mobile user device, as indicated by block 54.

Displaying the offer may entail displaying a variety of different types of digital content selected by the offer publisher server based on the requested offers. For instance, some embodiments may retrieve at the server and display on the client device a prose description of the offer and associated images, or some embodiments may retrieve content touting the product, explaining the product, or emphasizing aspects of the product's brand, like video or audio sales pitches, tutorials, or commercials. In some cases, the retrieved and displayed content does not contain an offer for sale and focuses on enhancing a brand, like a music video in which the product is used by a celebrity.

It should be noted that the steps of process 32, like the other processes described herein, need not necessarily be performed in the order illustrated or all be performed, which is not to suggest that any other feature described herein may not also be omitted in some embodiments. For example, in some cases, step 42 may be performed before step 40, and an image already resident in memory may be retrieved in response to such a request. In another example, step 44 may be performed before step 40, and a most recent wireless beacon identifier stored in memory may be retrieved in response to a request to search for offers.

Figure 3:
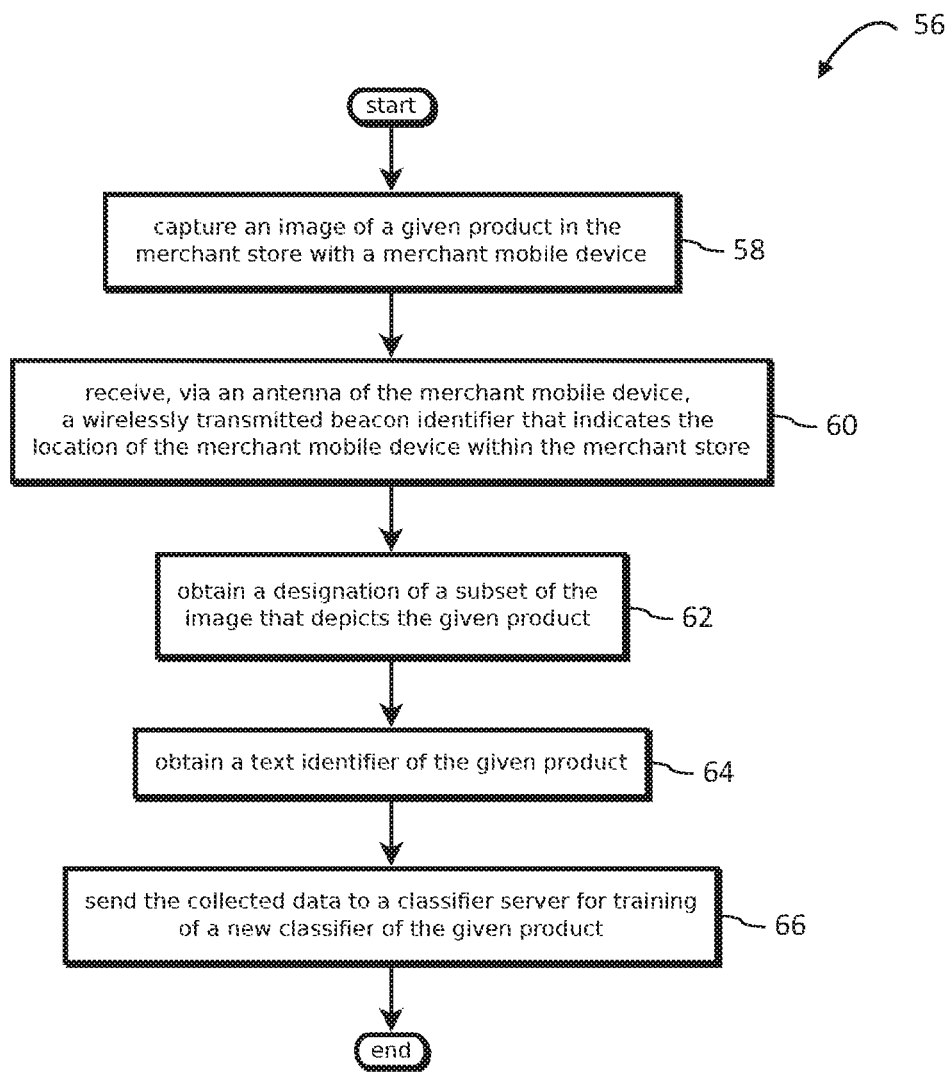
FIG. 3 shows an example of a process for capturing training data to train classifiers of products appearing in images.

FIG. 3 shows an example of a process 56 for capturing training data for training classifiers for new products. In this example, the process 56 includes capturing an image of a given product in the merchant's store with a merchant mobile device, as indicated by block 58, and receiving, via an antenna of the merchant mobile device, a wirelessly transmitted beacon identifier that indicates the location of the merchant mobile device within the merchant's store, as indicated by block 60. Embodiments may further include obtaining a designation of a subset of the image that depicts the given product, as indicated by block 62, such as a manual or algorithmic cropping of the captured image to exclude portions of the image that do not depict the product at issue. Embodiments of process 56 may also include obtaining a text identifier of the given product, as indicated by block 64, for example, a universal product code or a prose description of the product entered by a merchant employee. Next, embodiments may send the collected data from steps 58, 60, 62, and 64, to a classifier server for training a new classifier of the given product, as indicated by block 66. In some cases, a plurality of images of the product may be captured, for example, video frames captured from a variety of different perspectives, to render the classifier more robust to variations in camera pose and lighting conditions.

Figure 4:
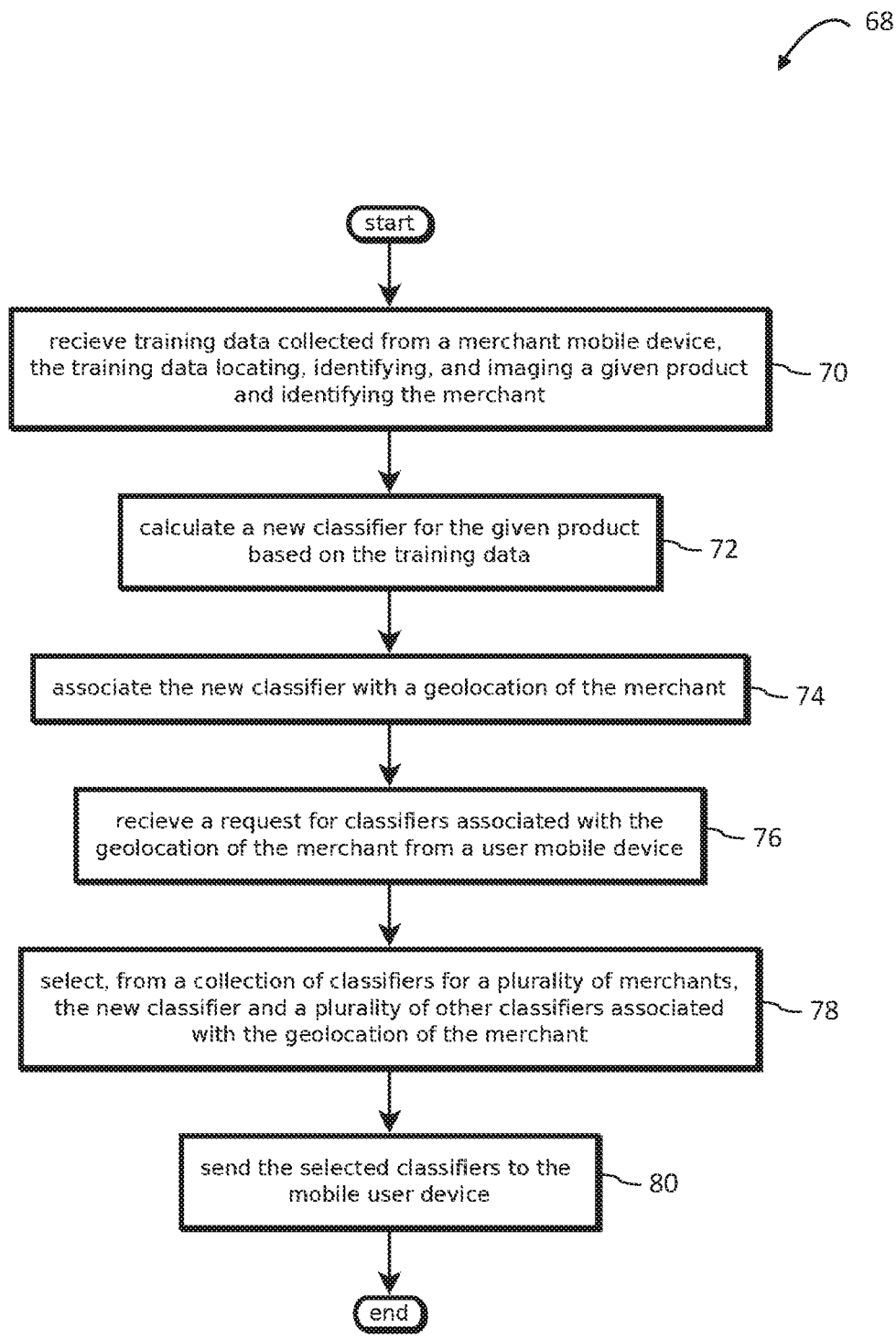
FIG. 4 shows an example of a process for training and distributing classifiers based on location.

FIG. 4 shows an example of a process 68 for training a classifier for a given product based on the data collected in the process of FIG. 3 and for serving the classifiers, as may be performed by the classifier server 20 described above. In this example, the process 68 includes receiving training data collected from a merchant mobile device, where the training data locates, identifies, and images (depicts in images) a given product, and identifies the merchant, as indicated by block 70. Next, embodiments may calculate a new classifier for the given product based on the training data, as indicated by block 72, and associate the new classifier with a geolocation of the merchant, as indicated by block 74. Embodiments may further receive a request for classifiers associated with the geolocation of the merchant from a mobile user device, as indicated by block 76, and in response, select, from a collection of classifiers for a plurality of merchants, the new classifier and a plurality of other classifiers associated with the geolocation of the merchant, as indicated by block 78. Next, embodiments may send the selected classifiers to the mobile user device, as indicated by block 80.

The present techniques have been described in relation to offer-discovery applications, but it should be noted that the techniques described herein are useful in other domains. For instance, image-based search generally, augmented reality applications, facial recognition, gait recognition, and the like may also benefit from smaller search spaces that reduce, based on location, the number of candidate classifiers to be applied. In other examples, wireless signals may reduce the search space for classifiers based on attributes other than location. For instance, a wireless signal may indicate that a particular subset of classifiers are potentially relevant because objects classified by that subset are known to be associated with that wireless signal, e.g., the objects themselves may emit the wireless signal.

Figure 5:
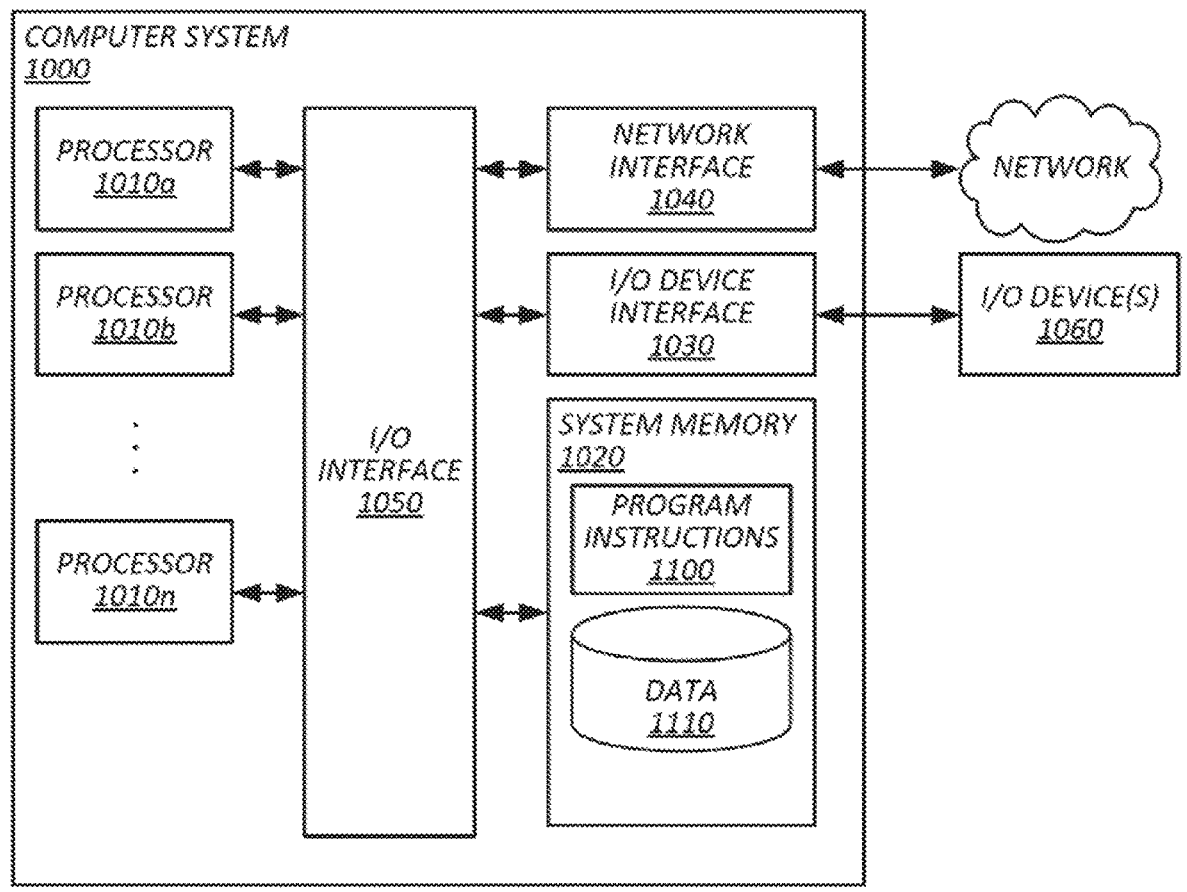
FIG. 5 shows an example of a computer system by which the present techniques may be implemented.

FIG. 5 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. The term "each" is not limited to "each and every" unless indicated otherwise. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The present techniques will be better understood with reference to the following enumerated embodiments:

1. A method of searching for electronic coupons or other offers based on an image captured by a camera of a mobile user device of a product for sale in a merchant's store, wherein the product is recognized in the image by the mobile user device without sending the image to a remote computer for image recognition, the method comprising: obtaining, in memory of a mobile user device, a set of object-recognition classifiers, the object-recognition classifiers each specifying one or more algorithms and parameters of those algorithms by which respective products among a plurality of products in a merchant store are recognized in images; commanding, with one or more processors of the mobile user device, a camera of the mobile user device to capture an image; receiving the captured image; receiving, via an antenna of the mobile user device, a wirelessly transmitted beacon identifier that indicates a location of the mobile user device within the merchant store, wherein indicating the location of the mobile user device includes distinguishing the location of the mobile user device from a plurality of other locations in the merchant store where other wireless beacon identifiers are transmitted; selecting a subset of the object-recognition classifiers based on the received beacon identifier, the subset of the object-recognition classifiers being configured to indicate whether at least some products positioned within range of the received wireless beacon identifier appear in the image; recognizing a product in the image by executing the algorithms specified by the subset of object-recognition classifiers with the one or more processors of the mobile user device; and obtaining a coupon or other offer based on the recognized product.

2. The method of embodiment 1, wherein: obtaining the set of object-recognition classifiers comprises, before commanding the camera of the mobile user device to capture the image: determining that a mobile computing device has crossed a geofence associated with the merchant store based on cellular or satellite navigation signals received by the mobile user device while outside of the merchant store; sending, to a remote classifier server, a request for object-recognition classifiers for products in the merchant store; and receiving, from the remote classifier server, a set of object-recognition classifiers; at least one of the object-recognition classifiers comprises: an identifier of a given product; identifiers of a plurality of object-recognition functions stored in the memory of the mobile user device before obtaining the set of object-recognition classifiers; weightings and a sequence that specify a cascaded arrangement of the object-recognition functions; and parameters of the object-recognition functions that cause the image recognition function to output a value indicative of whether the given product appears in the image; receiving the captured image comprises receiving a plurality of video frames captured over a trailing duration; receiving the wirelessly transmitted beacon identifier comprises receiving a Low-Energy Bluetooth beacon and measuring a beacon signal strength that together specify the location of the mobile user device in an aisle of the merchant store to within less than plus-or-minus five meters; selecting the subset of the object-recognition classifiers based on the received beacon identifier comprises: determining a product section of the merchant store based on the received beacon identifier; and filtering from the set of object-recognition classifiers those classifiers that identify a product in the product section of the merchant store to exclude those object-recognition classifiers that do not pertain to the product section of the merchant store; recognizing the product in the image comprises: for each video frame among the plurality of video frames, calculating a score with each classifier among the subset of the object-recognition classifiers; calculating a measure of central tendency among the plurality of video frames for each classifier among the subset of the object-recognition classifiers; and determining that the measure of central tendency of the classifier corresponding to the product satisfies a threshold; obtaining the coupon or other offer based on the recognized product comprises: parsing from the classifier corresponding to the product a text string; sending a query including the text string to a remote offers engine; receiving one or more offers responsive to the query; and presenting at least some of the one or more offers on a display screen of the mobile user device.

3. The method of any of embodiments 1-2, wherein the wirelessly transmitted beacon identifier is a Low-Energy Bluetooth beacon identifier transmitted by one of a plurality of battery-powered Low-Energy Bluetooth beacons distributed in the merchant store, the method further comprising: measuring a signal strength of the signal with which the wirelessly transmitted beacon identifier is received; and determining a location of the mobile user device in the merchant store based on both the signal strength and the received beacon identifier.

4. The method of any of embodiments 1-3, wherein selecting a subset of the object-recognition classifiers based on the received beacon identifier comprises: determining a product section of the merchant store in which the mobile user device is located and filtering from the set of object-recognition classifiers those classifiers associated with a product in the product section of the merchant store.

5. The method of any of embodiments 1-4, wherein obtaining, in memory of the mobile user device, the set of object-recognition classifiers comprises: obtaining one or more cascades of classifiers, each stage of the cascades corresponding to a different classifier from either an upstream classifier or a downstream classifier in the respective cascade, and each cascade of classifiers being configured to output a score indicative of whether a given product is depicted in a given image.

6. The method of any of embodiments 1-5, wherein receiving the captured image comprises storing a plurality of video frames with the camera of the mobile device in a video buffer; and recognizing a product in the image comprises: calculating scores with each of the subset of object-recognition classifiers for each of the frames of video in the video buffer; calculating a measure of central tendency of the scores for each of the classifiers among the subset of object-recognition classifiers; and determining whether a product is present in the video frames by determining whether at least one of the measures of central tendency satisfies a threshold.

7. The method of any of embodiments 1-6, comprising: polling an accelerometer of the mobile user device to receive a value indicative of movement of the mobile user device; and determining to recognize the product in the image in response to the value indicating less than a threshold amount of movement.

8. The method of any of embodiments 1-7, wherein at least some of the object-recognition classifiers each comprise: an identifier of a given product; an identifier of an object-recognition function stored in the memory of the mobile user device before obtaining the set of object-recognition classifiers; and parameters of the object-recognition function that cause the object-recognition function to output a value indicative of whether the given product appears in an image.

9. The method of any of embodiments 1-8, wherein obtaining the set of object-recognition classifiers comprises: determining that the mobile user device is in a geographic area associated with the merchant store and, in response: sending, to a remote classifier server, a request for object-recognition classifiers for objects in the merchant store; and receiving, from the remote classifier server, the set of object-recognition classifiers associated with the merchant store.

10. The method of any of embodiments 1-9, comprising updating the set of object-recognition classifiers for the merchant store with a merchant mobile device, wherein updating the set of object-recognition classifiers comprises: capturing another image of a given product in the merchant store with the merchant mobile device; receiving, via an antenna of the merchant mobile device, the wirelessly transmitted beacon identifier that indicates the location of the merchant mobile device within the merchant store; and calculating a classifier operative to indicative whether the given product is depicted in a given image based on the other image.

11. The method of claim 10, comprising: designating a subset of the other image that depicts the product by receiving human input identifying the subset of the other image, wherein calculating a classifier comprises calculating a classifier based on the subset of the other image.

12. The method of claim 10, comprising: detecting, in the other image, an object placed in a scene with the given product to indicate the location of the given product in the other image; designating a subset of the other image that depicts the given product based on a position of the detected object by detecting the object placed in the scene, wherein calculating a classifier comprises calculating a classifier based on the subset of the other image.

13. The method of any of embodiments 1-12, comprising: sending a text query to a remote computer system for an offer, wherein the text query corresponds to a classifier among the subset of the classifiers that output a score satisfying a threshold; wherein obtaining a coupon or other offer based on the recognized product comprises receiving an offer responsive to the query; and sending, to an offer issuer or affiliate network, data indicating that the offer was sent to the mobile user device.

14. A method, comprising: determining that a mobile computing device has crossed a geofence associated with a merchant store; sending, to a remote classifier server, a request for object-recognition classifiers for objects in the merchant store; receiving, from the remote classifier server, a set of object-recognition classifiers; receiving with the mobile computing device from user a request to search for offers; capturing an image with a camera of the mobile computing device; receiving one or more wireless beacon identifiers with the mobile computing device; based on the wireless beacon identifiers, selecting a subset of the object-recognition classifiers in the set of object-recognition classifiers; and recognizing an object in the captured image based on the selected subset of the object-recognition classifiers; and requesting, from a remote offer publisher server, offers corresponding to the recognized object; and receiving offers from the remote offer publisher server; and displaying the received offers to the user.

15. A tangible, non-transitory, machine-readable medium storing instructions that when executed by a data processing apparatus cause the data processing apparatus to perform operations comprising: the steps of any of embodiments 1-14.

16. A system, comprising: one or more processors; and memory storing instructions that when executed by the processors cause the processors to effectuate operations comprising: the steps of any of embodiments 1-14.

What is claimed is:

1. A tangible, non-transitory, machine-readable medium storing instructions that when executed by one or more processors effectuate operations, comprising:
   obtaining, with a mobile computing device, an object classifier configured to receive data based on at least part of an image and output a value indicative of whether a corresponding object appears in the image, wherein:
     the object classifier comprises a cascade of classifiers including at least two stages,
       a first stage comprising a first classifier configured to output a score indicating that the object is potentially in the image, and
       a second stage comprising a first downstream classifier configured to output a value indicative of whether the object appears in the image and a second downstream classifier configured to output a value indicative of whether another object appears in the image, the first downstream classifier having at least one associated parameter different from the second downstream classifier,
     at least one classifier in the cascade of classifiers is trained with gradient descent to reduce error of a determination that a labeled instance of the object is in training set images, and
     the score is indicative of a likelihood the object appears in the image;
   accessing, with the mobile computing device, an image captured with a camera of the mobile computing device;
   determining; by the mobile computing device, based on at least part of the captured image and the object classifier, that the object or another object appears in the captured image, wherein:
     the at least part of the captured image is processed with the first classifier of the first stage, the first classifier outputting at least one score indicating that the object is potentially in the image, and
     the at least part of the captured image is processed with the first downstream classifier or the second downstream classifier responsive to the at least one score; and
   storing, by the mobile computing device, a result of the determination in memory of the mobile computing device, wherein determining that the object or another object appears in the captured image is performed before or without sending the captured image via a network to a remote server.

2. The medium of claim 1, comprising:
   presenting data based on the result of the determination in an augmented reality application executing on the mobile computing device.

3. The medium of claim 1, wherein obtaining the object classifier comprises:
   sending a request via a network for a set of classifiers;
   receiving the set of classifiers, including the first classifier and the downstream classifiers and a plurality of other object classifiers, via the network;
   storing the set of classifiers in memory before capturing the image.

4. The medium of claim 3, wherein:
   determining that the corresponding object appears in the captured image comprises:
     applying the object classifier by applying the first classifier and, after applying the first classifier, applying at least one of the first or second downstream classifiers to the captured image.

5. The medium of claim 1, wherein:
   the object classifier is trained by iteratively, for at least one classifier associated with each stage:
     adjusting weights based on attempted classifications of labeled training images,
     error calculation of the attempted classifications, and
     determining gradients in the calculated error as a function of the weights, wherein weights are adjusted in a direction the gradients indicate reduces the error; and
   wherein the at least one associated parameter is adjusted during training of at least the first downstream classifier in a respective direction according to a direction of gradient descent that reduces error of a determination that the object appears in the image.

6. The medium of claim 1, wherein:
   the object classifier comprises a scale-invariant classifier configured to sub-sample captured images in at least one stage in the cascade of a plurality of classifiers.

7. The medium of claim 6, wherein:
   the cascade includes a neural network and a support vector machine.

8. The medium of claim 1, comprising:
   obtaining audio with the mobile computing device;
   receiving audio with a microphone of the mobile computing device;
   determining whether the audio contains a corresponding keyword that the audio classifier is configured to detect, wherein the determination is made before or without sending the received audio to a remote server; and executing a routine in response to determining that the received audio contains the keyword.

9. The medium of claim 1, wherein obtaining the object classifier comprises:
obtaining a plurality of executable algorithms associated with one or more classifiers;
sending a request to a remote server via a network for the object classifier; and
receiving a response encoding parameters for three or more executable algorithms and a sequence in which the algorithms are executed to implement the object classifier via the network.

10. The medium of claim 1, wherein accessing the image captured with the camera of the mobile computing device comprises:
polling an accelerometer of the mobile computing device; and
selecting the image based on a determination that less than a threshold amount of movement of the mobile device was indicated by the accelerometer of the mobile computing device when the image was captured with the camera.

11. The medium of claim 1, wherein determining based on at least part of the captured image and the object classifier, that the object or another object appears in the captured image comprises:
segmenting the image into a plurality of blocks each comprising at least part of the captured image; and
processing each of the plurality of blocks with at least the first classifier in the cascade of classifiers.

12. A computer implemented method, comprising:
obtaining, on a non-transitory computer readable medium of a mobile computing device storing computer program instructions executable by one or more processors of the mobile computing device, an object classifier configured to receive data based on at least part of an image and output a value indicative of whether a corresponding object appears in the image, wherein:
the object classifier comprises a cascade of classifiers including at least two stages,
a first stage comprising a first classifier configured to output a score indicating that the object is potentially in the image, and
a second stage comprising a first downstream classifier configured to output a value indicative of whether the object appears in the image and a second downstream classifier configured to output a value indicative of whether another object appears in the image, the first downstream classifier having at least one associated parameter different from the second downstream classifier,
at least one classifier in the cascade of classifiers is trained with gradient descent to reduce error of a determination that a labeled instance of the object is in training set images, and
the score is indicative of a likelihood the object appears in the image and the at least one associated parameter is adjusted during training of the second stage in a respective direction for each downstream classifier according to a direction of gradient descent that reduces error of a determination that the object or another object appears in the image;
accessing, with the mobile computing device, an image captured with a camera of the mobile computing device;
determining, by the mobile computing device, based on at least part of the captured image and the object classifier, that the object or another object appears in the captured image, wherein:
the at least part of the captured image is processed with the first classifier of the first stage, the first classifier outputting at least one score indicating that the object is potentially in the image, and
the at least part of the captured image is processed with the first downstream classifier or the second downstream classifier responsive to the at least one score; and
storing a result of the determination in a memory of the mobile computing device, wherein determining that the object or another object appears in the captured image is performed before or without sending the captured image via a network to a remote server.

13. The computer implemented method of claim 12, wherein obtaining the object classifier comprises:
sending a request via a network for a set of classifiers;
receiving the set of classifiers, including the first classifier and the downstream classifiers and a plurality of other object classifiers, via the network;
storing the set of classifiers in memory before capturing the image.

14. The computer implemented method of claim 13, wherein:
determining that the corresponding object appears in the captured image comprises:
applying the object classifier by applying the first classifier and, after applying the first classifier, applying at least one of the first or second downstream classifiers to the captured image.

15. The computer implemented method of claim 12, wherein:
the object classifier is trained by iteratively, for at least one classifier associated with each stage:
adjusting weights based on attempted classifications of labeled training images,
error calculation of the attempted classifications, and
determining gradients in the calculated error as a function of the weights, wherein weights are adjusted in a direction the gradients indicate reduces the error.

16. The computer implemented method of claim 12, wherein:
the object classifier comprises a scale-invariant classifier configured to sub-sample captured images in at least one stage in the cascade of a plurality of classifiers, and
the cascade includes a neural network and a support vector machine.

17. The computer implemented method of claim 12, comprising:
obtaining audio with the mobile computing device;
receiving audio with a microphone of the mobile computing device;
determining whether the audio contains a corresponding keyword that the audio classifier is configured to detect, wherein the determination is made before or without sending the received audio to a remote server; and
executing a routine in response to determining that the received audio contains the keyword.

18. The computer implemented method of claim 12, wherein obtaining the object classifier comprises:
obtaining a plurality of executable algorithms associated with one or more classifiers;
sending a request to a remote server via a network for the object classifier; and receiving a response encoding parameters for three or more executable algorithms and a sequence in which the algorithms are executed to implement the object classifier via the network.

19. The computer implemented method of claim 12, wherein accessing the image captured with the camera of the mobile computing device comprises:

polling an accelerometer of the mobile computing device; and selecting the image based on a determination that less than a threshold amount of movement of the mobile device was indicated by the accelerometer of the mobile computing device when the image was captured with the camera.

20. The computer implemented method of claim 12, wherein determining based on at least part of the captured image and the object classifier, that the object or another object appears in the captured image comprises:

segmenting the image into a plurality of blocks each comprising at least part of the captured image; and processing each of the plurality of blocks with at least the first classifier in the cascade of classifiers.

\* \* \* \* \*